(12) United States Patent
Lende et al.

(10) Patent No.: US 7,954,549 B2
(45) Date of Patent: Jun. 7, 2011

(54) METHODS OF USING COLLOIDAL SILICA BASED GELS

(75) Inventors: Gunnar Lende, Sela (NO); Stein Olaussen, Tananger (NO)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 12/723,054

(22) Filed: Mar. 12, 2010

(65) Prior Publication Data

US 2010/0224366 A1 Sep. 9, 2010

Related U.S. Application Data

(63) Continuation of application No. PCT/GB2007/003469, filed on Sep. 13, 2007.

(51) Int. Cl.
*E21B 33/138* (2006.01)

(52) U.S. Cl. ........................................ 166/293; 166/300

(58) Field of Classification Search .................. None
See application file for complete search history.

(56) References Cited

U.S. PATENT DOCUMENTS

| 5,149,370 A | | 9/1992 | Olaussen et al. | |
|---|---|---|---|---|
| 5,339,903 A | * | 8/1994 | Eoff et al. | 166/293 |
| 5,355,954 A | | 10/1994 | Onan et al. | |
| 2005/0079016 A1 | * | 4/2005 | Greenwood et al. | 405/266 |
| 2005/0274516 A1 | | 12/2005 | Nelson et al. | |

FOREIGN PATENT DOCUMENTS

| CA | 1051774 A1 | 4/1979 |
|---|---|---|
| GB | 2392460 A | 3/2004 |
| GB | 2405636 A | 3/2005 |
| WO | 8702093 A1 | 4/1987 |
| WO | 2004018381 A1 | 3/2004 |
| WO | 2006117535 A1 | 9/2006 |

OTHER PUBLICATIONS

International Search Report for PCT/GB2007/003469, mailed Sep. 17, 2008.

* cited by examiner

*Primary Examiner* — Zakiya W. Bates
(74) *Attorney, Agent, or Firm* — Robert A. Kent; McDermott Will & Emery LLP (57) ABSTRACT

Methods of controlling flow through a subterranean formation may include providing a cement slurry, a colloidal silica, and an activator. The methods may include introducing the cement slurry, the colloidal silica, and the activator into a portion of a well bore that penetrates a subterranean formation The methods may include allowing the cement slurry, colloidal silica, and activator to remain static.

14 Claims, 5 Drawing Sheets

METHODS OF USING COLLOIDAL SILICA BASED GELS

CROSS-REFERENCE TO RELATED APPLICATION

This application is a continuation of PCT Application No. PCT/GB2007/003469, filed Sep. 13, 2007, the disclosure of which are hereby incorporated by reference in its entirety.

TECHNICAL FIELD

The present invention generally relates to the use of colloidal silica in subterranean treatments. More specifically, the present invention relates to the use of treatment fluids that comprise a colloidal silica component. In another aspect, the present invention relates to subterranean cements comprising a treatment fluid that comprises a colloidal silica component. The methods of the present invention may be particularly useful in water injection wells, gas injection wells, and hydrocarbon wells and recovery operations.

BACKGROUND ART

When hydrocarbons are produced from wells that penetrate hydrocarbon producing formations or zones, water often accompanies the hydrocarbons, particularly as the wells mature in time. The water can be the result of a water producing zone communicating with the hydrocarbon producing formations or zones by fractures, high permeability streaks and the like, or the water can be caused by a variety of other occurrences which are well known to those skilled in the art such as water coning, water cresting, bottom water, channeling at the well bore, etc. It becomes an economic necessity to improve the hydrocarbon/water ratio during hydrocarbon production such that recovery remains cost effective.

In enhanced recovery techniques such as water flooding, an aqueous flood or displacement fluid is injected under pressure into oil containing subterranean formations or zones by way of one or more injection wells. The flow of the aqueous fluid through the formations or zones displaces hydrocarbons contained therein and drives them to one or more producing wells. However, the aqueous displacement fluid often flows through the most permeable formations or zones whereby less permeable formations or zones containing hydrocarbons are bypassed. This uneven flow of the aqueous displacement fluid through the formations or zones reduces the overall yield of hydrocarbons therefrom. Heretofore. enhanced recovery problems in subterranean hydrocarbon containing formations or zones caused by permeability variations therein have been corrected by reducing the permeabilities of the subterranean flow paths having high permeabilities and low hydrocarbon content. As a result, the subsequently injected aqueous displacement fluid is forced through flow paths having low permeability and high hydrocarbon content.

There has been a continuing and long-felt need for improving the oil/water ratio during hydrocarbon production by using chemical gel systems to resist the flow of injected or natural aqueous drive fluid through high permeability channels and fractures. Techniques utilized to improve the hydrocarbon/water ratio and/or to reduce high flow path permeability during enhanced recovery operates are referred to in the art as "conformance control techniques."Conformance control techniques have also been used to modify the gas permeability of a formation. The general approach of most conformance control techniques has been to inject a mixture of reagents, initially low in viscosity, into a zone of the formation that has high permeability. After a sufficient time to allow the mixture to be pumped into the subterranean formation or when exposed to the elevated temperature of the formation, the mixture of reagents then forms a barrier to at least partially block the flow of water and/or gas through the zone. As used herein, the term "zone" simply refers to a portion of a formation and does not imply a particular geological strata or composition. For example, previous methods have included injecting aqueous solutions of polymers and activators into the high permeability flow paths whereby the polymers are gelled and cross-linked therein. Water soluble polymers including copolymers of acrylamide and acrylic acid cross-linked with transition metal ions are among the systems that have been used.

One drawback to some of the gels that have previously been used as conformance control materials or as other types of subterranean treatments, e.g., sand consolidation treatments, is that those gels may be viewed as unsuitable for subterranean use in some areas according to certain environmental protection guidelines and regulations. Another drawback is that treatment fluids that comprise conventional polymers and activators may not gel sufficiently at the low temperatures that may be encountered in some subterranean formations, e.g., temperatures below about 20° C. One substance that may meet even rigorous environmental guidelines for use in subterranean operations is colloidal silica.

Heretofore, colloidal silica has been used as an additive in cements that are intended for subterranean cementing operations. For example, colloidal silica has been added to subterranean cements as an extender and viscositier. Colloidal silica has also been added to subterranean cement slurries to prevent the migration of gas through the cement slurry in the fluid-to-solid transition phase. One such commercially available cement additive that comprises colloidal silica is the product commercially available from Halliburton under the trade name GASCON 469™. Another such commercially available cement additive that comprises colloidal silica is the product commercially available from Halliburton under the trade name FDP-C725-04. Most of the prior art cements have been substantially free of substances that would cause the colloidal silica in a cement slurry to accelerate the formation of a colloidal silica gel. Hence, the cement has hardened before such a reaction has taken place.

It is believed that WO 2004/0138381, at least in some respect, teaches an injection grouting technique in which a composition comprising colloidal silica particles, alkali metal silicate or organic silicate, and at least one gelling agent that is capable of gelling colloidal silica is injected into distinct permeable areas referred to therein as "cavities or leaking parts such as . . . fissures [or] cracks." Id. at page 2, lines 33-35. One proposed use for the injection grouting technique is to seal openings in "constructions such as . . . well cementing." Id. at page 2, lines 33-37. It is apparent from the disclosure of WO 2004/0138381 that the injection grouting of well cement would involve sealing a hole that has developed in a pre-existing well cement construction, e.g., a fracture in a pre-existing sheath of cement located in a well bore. As such, WO 2004/0138381 does not disclose the creation of a new cement sheath or the treatment of an entire well bore to effect an overall reduction in permeability of the most permeable areas of the well bore.

It is believed that WO 03/033618, at least in some respect, teaches a composition that comprises a silica sol with an S-value higher than about 72% and at least one gelling agent, and methods of using that composition by inserting it into a leaking part or cavity. According to WO 03/033618, the principle application for the composition disclosed therein is the creation of subsurface barriers to water flow. Id. at page 6, lines 8-14. For example, the application discloses inserting the composition into a microcrack or other cavity in a rock. Id. The application also discusses prior art compositions that have been used for sealing water leaks in concrete walls and tunnels, and sealing cavities that form behind concrete walls. Id. at page 1, lines 10-12, 26-29. Although WO 03/033618 indicates that the composition may be suitable for use in subsurface areas and may be able to withstand high water pressure, it does not suggest using the composition in a well bore that penetrates a subterranean formation, e.g., a well bore that penetrates a hydrocarbon-bearing formation, with the intent of producing hydrocarbons through the formation matrix (e.g., pore space).

DISCLOSURE OF INVENTION

Methods that include a method of treating a well bore comprising providing a treatment fluid that comprises a colloidal silica component; optionally providing an activator; introducing the treatment fluid to a portion of a well bore that penetrates a subterranean formation; allowing the treatment fluid to flow into a permeable zone of the subterranean formation; allowing the colloidal silica component of the treatment fluid to be activated by the heat of the formation and/or by contacting the activator; and allowing the activated colloidal silica component to increase the viscosity of the treatment fluid in the permeable zone of the subterranean formation.

MODE(S) FOR CARRYING OUT THE INVENTION

The present invention generally relates to the use of colloidal silica in subterranean treatments. More specifically, the present invention relates to the use of treatment fluids that comprise a colloidal silica component. In another aspect, the present invention relates to subterranean cements comprising a treatment fluid that comprises a colloidal silica component. The methods of the present invention may be particularly useful in hydrocarbon wells and recovery operations, water injection wells, and gas injection wells.

There are believed to be many potential advantages in using treatment fluids and cements that comprise a colloidal silica component. One of the potential advantages may be that when the colloidal silica component in the treatment fluid or the cement contacts an activator and/or is exposed to a sufficiently high temperature, a colloidal silica gel may form that is substantially impermeable to fluid and/or gas. Another advantage may be that the colloidal silica component may react with an activator to create a colloidal silica gel even at relatively low temperatures, e.g., at about 20° C. or below. This reaction may be a substantially irreversible reaction. Yet another advantage in using colloidal silica to increase the viscosity of treatment fluids and/or cement slurries may be that colloidal silica is generally considered an environmentally sound material. For example, colloidal silica may be acceptable for subterranean use and discharge into the sea even in the most environmentally-sensitive or highly regulated subterranean operations. Additionally, colloidal silica may be readily available and more cost-effective than some polymers that have previously been used to viscosify treatment fluids. A particular benefit of using colloidal silica to create gelled treatment fluids may be that it is possible to achieve a stronger and stiffer gel with colloidal silica than with viscosifying agents such as sodium silicates. Therefore, the range of subterranean applications for treatment fluids that are gelled with colloidal silica may be wider than the range of applications available for treatment fluids that are gelled with sodium silicates. Yet another advantage of using colloidal silica to gel a treatment fluid may be that forming colloidal silica gels may require few steps and/or reagents. Additionally, it may be possible to control the gelling time with a fair degree of accuracy, e.g., by selecting an appropriate activator or by modulating the amount of activator that contacts the colloidal silica. In some cases, the temperature of the subterranean formation and/or salts or minerals that are naturally present in the subterranean formation may act as the activator, eliminating the need to introduce an activator from the surface.

In some embodiments, the present invention provides a method of treating a well bore comprising providing a treatment fluid that comprises a colloidal silica component; optionally providing an activator; introducing the treatment fluid to a well bore that penetrates a portion of a subterranean formation; allowing the treatment fluid to flow into a permeable zone of the subterranean formation; allowing the colloidal silica component of the treatment fluid to be activated by the heat of the formation and/or by contacting the activator; and allowing the viscosity of the activated treatment fluid to increase in the permeable zone of the subterranean formation. In some embodiments, the viscosified treatment fluid may at least partially block the flow of fluids and/or gas through the permeable zone.

As used herein, the term "treatment fluid" refers to any fluid that may be used in a subterranean application in conjunction with a desired function and/or for a desired purpose. The term "treatment fluid" does not imply any particular action by the fluid or any component thereof. Similarly, the term "treatment," or "treating," as used herein, refers to any subterranean operation performed in conjunction with a desired function and/or for a desired purpose. The term "treatment," or "treating" does not imply any particular action. The treatment fluids utilized in the current invention may further comprise an aqueous base fluid. In some embodiments, the aqueous base fluid may comprise fresh water, salt water (e.g., water containing one or more salts dissolved therein), brine (e.g., saturated salt water), seawater, or any other aqueous liquid that does not adversely react with the other components utilized in accordance with this invention or with the subterranean formation. In some embodiments, the treatment fluids may comprise a non-aqueous base fluid. According to some embodiments, both an aqueous and a non-aqueous base fluid may be used. For example the treatment fluid may comprise a base fluid that comprises an emulsion of a non-aqueous base fluid and an aqueous base fluid.

In some embodiments, the colloidal silica component of the present invention is present in a treatment fluid in an amount in the range of from about 25% to about 100% by weight of the treatment fluid. In preferred embodiments, the colloidal silica component is present in an amount in the range of from about 50% to about 100% by weight of the treatment fluid. In general, a colloidal silica component that is suitable for use in the present invention comprises colloidal silica particles. As used herein, the term "colloidal silica particles" generally refers to amorphous particles that are described by the chemical formula $SiO_2$ and have an average diameter of about 150 nm or smaller. The present invention contemplates that the colloidal silica component utilized in the treatment fluids may be modified to, inter alia, improve the stability of the colloidal silica component at low pH, e.g., at pH's of about 9 or below. For example, a colloidal silica component of the present invention may be modified to further comprise an aluminum and/or boron compound.

The colloidal silica particles present in the colloidal silica component may be colloidal silica particles of any grade, particle size, or surface area, and the particles may have any particle size distribution. In some embodiments, the average particle size of the colloidal silica particles used in the methods of the present invention is about 40 nm or less. In some embodiments, the colloidal silica particles used in the present invention may have a particle size of about 15 nm or less, or more preferably, of about 10 nm or less. In one exemplary embodiment, the colloidal silica has a particle size in the range of about 2 nm to about 10 nm. In some embodiments, colloidal silica particles are present in the colloidal silica component in an amount in the range of from about 5% to about 60% by weight of the colloidal silica component. In one exemplary embodiment, colloidal silica particles are present in an amount of about 15% by weight of the colloidal silica component. In general, the colloidal silica component of the present invention may comprise any colloidal silica particles that are capable of increasing the viscosity of a treatment fluid without adversely reacting with other substances that are present in the treatment fluid or subterranean formation.

The activator that is used in certain embodiments of the present invention may comprise any substance that is capable of reacting with a colloidal silica component to increase the viscosity of a treatment fluid. In some embodiments, the activator may comprise an organic or inorganic salt, nitrate, sulphate, sulphide, hydroxide, or acid. In preferred embodiments, the activator may comprise salts such as sodium chloride, potassium chloride, sodium nitrate, potassium nitrate, and the like, and combinations thereof. In some embodiments the activator may be provided as a powdered material, while in other embodiments, the activator may be provided as a liquid material, e.g., as a solution or a suspension of a powdered material in liquid. The present invention contemplates that the activator may be introduced to the subterranean formation for the purpose of creating a colloidal silica gel or that the activator may have been introduced to the subterranean formation in the course of another subterranean treatment. It is also within the scope of the present invention that the activator may be naturally present in the subterranean formation, e.g. the activator may be present in formation fluids that are native to the formation. In some embodiments, the type and amount of activator used may depend on several factors including the colloidal silica component used, the temperature of the subterranean formation, the desired time in which the viscosity of the treatment fluid should begin to increase and/or reach its final viscosity, etc. In some embodiments, the activator may be present in the treatment fluid in an amount in the range of about 0.001% m/v to about 10% m/v of the colloidal silica component. As used herein, a treatment fluid comprising, for example 2% m/v activator, comprises about 2 grams of activator per approximately 100 mL of colloidal silica component in the treatment fluid. In some embodiments, the activator may be present in an amount in the range of about 0.01% m/v to about 5% m/v. In some embodiments, the activator may be present in an amount in the range of about 0.05% m/v to about 2% m/v of the colloidal silica component.

According to some embodiments in which an activator is used, the colloidal silica component and the activator react so that the viscosity of the treatment fluid is increased. In certain embodiments, this viscosifying reaction may occur even at relatively low temperatures, e.g., at temperatures of 20° C. or below. As used herein, the term "react" and its derivatives do not imply any specific chemical mechanism or modification and encompass all forms of mechanical, chemical, and electrostatic interaction. In some embodiments, when the subterranean temperature is sufficiently high, the viscosity of the treatment fluid may increase in the absence of an activator. It is believed that in some embodiments in which the subterranean temperature is about 100° C. or higher, the viscosity of the treatment fluid may increase in the absence of an activator. It is further believed that higher temperatures may cause the viscosifying reaction to occur more quickly, e.g., a treatment fluid may viscosify more quickly at a subterranean temperature of 120° C. than at a temperature of 100° C. By way of explanation, and not of limitation, it is believed that the subterranean temperature and/or activator causes the viscosity of the colloidal silica to increase by allowing the colloidal silica particles to aggregate.

In some embodiments, the viscosity of the treatment fluid may increase until the treatment fluid is very thick. For example, in some embodiments, the viscosity of the treatment fluid may increase until the treatment fluid has the properties of a ringing gel. As used herein, the term "ringing gel" refers to a gel that, when formed in a container, vibrates audibly when the side of the container is struck. In certain embodiments the viscosifying reaction may be substantially irreversible, so that the viscosity of the treatment fluid remains increased over a wide range of conditions.

In some embodiments in which an activator is used, the viscosity of the treatment fluid may not begin to appreciably increase for some period of time after the colloidal silica component has contacted the activator. For example, in some embodiments, the viscosity of a mixture of a colloidal silica component and an activator may not begin to appreciably increase for a period of about 5 minutes or longer (including, for example, a period of about 10 hours or longer) after the colloidal silica component and the activator are placed in contactable proximity. In some embodiments, the rate of the viscosifying reaction may be regulated by varying the relative amounts of the colloidal silica component and the activator. For example, at a given temperature, a treatment fluid that comprises a particular colloidal silica component may reach a pre-selected viscosity more quickly when it is combined with 2% m/v potassium chloride than when it is combined with 0.5% m/v potassium chloride. In some embodiments, other steps may be taken or other compositions may be used which delay or retard the rate with which the viscosity of the treatment fluid increases. For example, in certain embodiments in which an activator is used, the activator may be coated in a soluble coating that dissolves over time, so that the activator does not directly contact colloidal silica particles until the coating has at least partially dissolved.

According to some embodiments, a retarder may be used to delay the viscosifying reaction. It is also contemplated that other steps may be taken or other compositions may be used which delay or retard the viscosifying reaction. For example, a buffering agent that has the effect of slowing the viscosifying reaction may be used. In some embodiments, the specific surface of the colloidal silica particles may be altered to change the reactivity of the particles and thereby adjust the gelling time. For example, increasing the surface area of the particles may shorten the gel time, and reducing the surface area may increase the gel time. The surface area is typically adjusted by adjusting the particle size of the colloidal silica particles used in the treatment fluid.

In some exemplary embodiments, the methods of the current invention may comprise mixing an activator with a treatment fluid that comprises a colloidal silica component before the treatment fluid is introduced into a portion of a subterranean formation penetrated by a well bore. The present invention contemplates that the viscosity of the treatment fluid that is pre-mixed with an activator may increase to form an at least partially viscosified treatment fluid before the treatment fluid is introduced to a portion of a subterranean formation or, alternatively, that the viscosity of the treatment fluid may not begin to appreciably increase until the treatment fluid has been introduced into the portion of the subterranean formation. In some embodiments, the methods of the current invention may comprise providing a colloidal silica component and an activator, introducing the colloidal silica component and the activator separately into a portion of a subterranean formation that is penetrated by a well bore, and allowing the activator to react with the colloidal silica component in the portion of the subterranean formation to form a viscosified treatment fluid.

In some embodiments in which a treatment fluid comprising a colloidal silica component is allowed to flow into a permeable zone of a subterranean formation, the treatment fluid may penetrate a distance up to about 1 meter from the well bore. In preferred embodiments, the treatment fluid, its separate components, and/or the activator are introduced to a portion of the subterranean formation so that the treatment fluid, its separate components, and/or the activator penetrate the pore matrix of a portion of the subterranean formation to be treated. In some embodiments, the subterranean formation may comprise fractures that may extend further than 1 meter from the well bore, e.g., several thousands of meters from the well bore. It is contemplated that the treatment fluids of the present invention may flow into these fractures and thus penetrate a distance of substantially more than 1 meter from the well bore. In some embodiments, when the treatment fluid is introduced into the subterranean formation, some of the treatment fluid may be underdisplaced such that some of the treatment fluid remains inside the well bore. Later, the treatment fluid that remains in the well bore may be mechanically removed, e.g. by high pressure washing or jetting with a post-flush fluid, or by drilling through the treatment fluid with a drill bit.

In some embodiments, the mechanical strength of the viscosified treatment fluids may increase over a period of several days from the time that the treatment fluid first begins to gel, e.g., several days from the time that the colloidal silica component contacts the activator. According to one exemplary embodiment, although the fastest rise in mechanical strength may be observed during the first 100 days from the start of the viscosifying reaction, the mechanical strength may continue to rise over a period of several hundred more days. In the same or other embodiments, the shear strength of the viscosified treatment fluids of the present invention may continue to increase over a period of several days from the time the viscosifying reaction begins. The increase in shear strength over time may depend on the temperature of the treatment fluid, such that a higher temperature may promote the development of higher shear strength.

In some embodiments, in order to allow the viscosity of a treatment fluid to reach a desired level or achieve a desired strength, the methods of the present invention may comprise shutting in a well for some period of time after the treatment fluid has been introduced. In some embodiments, shut-in times may comprise periods of from about one hour to about seven days. In some embodiments, the shut in times may comprise periods of about three to about fifteen hours.

Other materials that may be included in the treatment fluids of the present invention include, but are not limited to, mineral oils, elastomers, viscosifiers, gases such as nitrogen, foaming agents, lightweight materials such as hollow or porous spheres, weighting agents, salts, formates, fluid loss control agents, bridging agents, and additives that alter the mechanical properties of the gelled treatment fluids, such as fibers to increase the tensile strength of the gel, pozzolanic materials such as cement, fly ash or fume silica, loss control materials, and combinations of the foregoing. The present invention contemplates that these additives may be added to either the colloidal silica component or the activator before those components are in contact with each other, or that the additive may be added to a treatment fluid that comprises the colloidal silica component at any time before the treatment fluid reaches a final maximum viscosity.

In some embodiments, the viscosified treatment fluids of the current invention may further comprise weighting agents. Weighting agents suitable for use in the present invention are particles that increase the density of the treatment fluid. Moreover, weighting agents suitable for use in the present invention may be particles that act as fluid loss control materials. Weighting agents that may be suitable for use in the present invention include, but are not limited to, barite, silica flour, particulate stone (such as ground and sized limestone or marble), graphitic carbon, ground battery casings, swellable rubbers, calcium carbonate, glass, mica, ceramics, ground drill cuttings, iron oxides, manganese oxide, ilmenite, fume silica, combinations thereof, derivatives thereof, and the like. In some embodiments, suitable weighting agents generally comprise small sized particulates such as silica flour. In preferred embodiments, the specific gravity of the treatment fluid may be varied between about 1.10 and 2.20 by varying the amount and type of weighting agent used. In some embodiments, salts, formates or other soluble materials may be used instead of or in addition to solid weighting agents.

In some embodiments, the treatment fluids of the present invention may comprise additives that alter the mechanical properties of the resultant gel. For example, colloidal silica gels that do not comprise additives, although they may be thick (e.g. have a stiff gel matrix), may have a relatively low tensile strength. For example, in the absence of additives, the tensile strength of the viscosified treatment fluid of the present invention may be as low as about 0.5 to 5 psi (0.0345 to 0.3447 bar). The tensile strength of the gel may be enhanced by adding materials such as fibers. Suitable fibers may comprise, but are not limited to, glass fibers, carbon fibers, metal fibers, polypropylene fibers, and mixtures thereof. In some embodiments, still other additives may be included in the treatment fluid. One such additive may be a foaming agent. A suitable foaming agent may be the product commercially available from Halliburton under the trade name ZONESEAL® 4000.

In some embodiments, the methods of the present invention may comprise introducing a pre-flush into the subterranean formation before the treatment fluid comprising a colloidal silica component is introduced. The pre-flush may be introduced in such a way and in such an amount that the pre-flush displaces formation fluids from the pore spaces in the portion of the subterranean formation to be treated with the treatment fluid. In some embodiments, the methods of the present invention may comprise introducing a post-flush into the subterranean formation after the treatment fluid comprising a colloidal silica component has been introduced. In some embodiments, the pre-flush and/or post-flush may comprise any aqueous base fluid and/or non-aqueous base fluid, as those terms have been described above. Certain embodiments of the present invention may comprise introducing a spacer fluid into the subterranean formation between the introduction of two other fluids, e.g., between the introduction of an activator and a treatment fluid that comprises a colloidal silica component. The spacer fluid may, inter alia, prevent the premature interaction of the activator with the colloidal silica component.

The methods of the present invention may be employed in a variety of subterranean applications. For example, the viscosified treatment fluids may be used as, inter alia, a conformance material, a lost circulation treatment, a sealant to reduce fluid or gas flow through the annular space between a casing string and a well bore wall, a component in a cement slurry intended to reduce fluid or gas flow through the annular space between a casing string and a well bore wall, a drillable and washable plug, and/or a sand consolidation treatment. In addition, the treatment fluids may be useful in vibration dampening or as a filler material. One example of such a use might be filling hollow parts of a steel construction, e.g. a pipe-shaped spar, with the treatment fluid to serve as a dampening material once cured. The principle of using the treatment fluid as a dampening material might be understood through certain parallels with the way in which rubber might provide dampening.

In some embodiments, methods of using viscosified treatment fluids as a conformance material may comprise: providing a treatment fluid that comprises a colloidal silica component; optionally providing an activator; introducing the treatment fluid to a portion of a well bore that penetrates a subterranean formation; allowing the treatment fluid to flow into a permeable zone of the subterranean formation; allowing the colloidal silica component of the treatment fluid to be activated by the heat of the formation and/or by contacting the activator; allowing the activated colloidal silica component to increase the viscosity of the treatment fluid in the permeable zone of the subterranean formation; and allowing the viscosified treatment fluid to form a barrier to the flow of fluid and/or gas through the permeable zone. According to some embodiments in which viscosified treatment fluids are used as conformance materials, the viscosified treatment fluid may take the form of a stiff colloidal silica gel that acts as a substantially impermeable barrier to fluid and/or gas flow through a relatively permeable zone of a subterranean formation. In some such embodiments, the fluid that is blocked may be water from water flooding operations, e.g. water that has been injected into neighboring wells during secondary recovery operations. In some embodiments, the viscosified treatment fluid may prevent the influx of water into a well bore that penetrates the subterranean formation, improving the water-to-hydrocarbon ratio in the hydrocarbons that are produced from the well.

In some embodiments, the present invention provides methods of using treatment fluids that comprise a colloidal silica component as a sand consolidation treatment comprising: providing a treatment fluid that comprises a colloidal silica component; optionally providing an activator; introducing the treatment fluid to a portion of a well bore that penetrates a subterranean formation; allowing the treatment fluid to flow into a permeable zone of the subterranean formation; allowing the colloidal silica component of the treatment fluid to be activated by the heat of the formation and/or by contacting the activator; allowing the activated colloidal silica component to increase the viscosity of the treatment fluid in the permeable zone of the subterranean formation; and allowing the viscosified treatment fluid to at least partially consolidate an unconsolidated portion of the subterranean formation. No particular mechanism of consolidation or stabilization is implied by the term "sand consolidation treatment." When used as a sand consolidation treatment, activated treatment fluids comprising colloidal silica may provide adhesive bonding between formation particulates to alter the distribution of the particulates within the formation. In some embodiments, the consolidating treatment may cause formation particulates to become involved in collective stabilized masses and/or may stabilize the formation particulates in place such that the migration of formation particulates that might negatively impact permeability and/or fracture conductivity is reduced. As used herein, the term "formation particulates" encompasses any loose particles within the unconsolidated portion of the subterranean formation, including, but not limited to, formation fines, formation sand, clay particulates, coal fines, and the like.

In some aspects, the present invention provides methods of using treatment fluids comprising a colloidal silica component in well cementing operations. In some embodiments, the present invention provides a method of well cementing comprising: providing a cement composition that comprises a cement; providing a treatment fluid that comprises a colloidal silica component; providing an activator; combining the cement composition and the treatment fluid; introducing the cement composition and the treatment fluid into a well bore that penetrates a portion of a subterranean formation; allowing the colloidal silica component to be activated by contacting the activator; and allowing the activated colloidal silica component to increase the viscosity of the cement composition. According to some cementing embodiments, the cement composition and the treatment fluid may be combined before they are introduced to the well bore, or the cement composition and the treatment fluid may be combined within the well bore. In general, once the cement composition and treatment fluid have been combined and the colloidal silica component has been activated (in either order of occurrence), a colloidal silica gel may form in the cement composition, increasing the viscosity of the cement composition. In some preferred embodiments, the colloidal silica gel that forms in the cement composition may at least partially block the migration of fluid and/or gas through the cement composition (which may be, for example, a cement slurry) before the cement composition sets.

Any cement suitable for use in subterranean cementing operations may be used in the cement compositions that comprise a cement. A variety of hydraulic cements are suitable for use in the methods of the present invention including those comprised of calcium, aluminum, silicon, oxygen, and/or sulfur, which set and harden by reaction with water. Such hydraulic cements include, but are not limited to, Portland cements, ultrafine particle Portland cement, pozzolana cements, gypsum cements, high alumina content cements, silica cements, and high alkalinity cements. Portland cements suited for subterranean cementing may be classified as Class A, C, H and G according to API Specification For Materials And Testing For Well Cements, API Specification 10, Fifth Edition, dated Jul. 1, 1990 of American Petroleum Institute. Other commercially available cement systems may also be used.

The cement compositions of this invention may further comprise sufficient liquid such that the cement composition is a pumpable slurry. In some embodiments, the liquid may comprise fresh water, salt water (e.g., water containing one or more salts dissolved therein), brine (e.g., saturated salt water produced from subterranean formations), seawater, or the like. Generally, the water can be from any source provided that it does not contain an excess of compounds that adversely affect other components in the cement composition or the performance of the cement composition relative to the subterranean conditions to which it may be subject. In a preferred embodiment, the amount of water used ranges from about 30% to about 150% by weight of the dry cement.

In some embodiments in which a cement composition is combined with a treatment fluid that comprises a colloidal silica component, the colloidal silica component is present in an amount in the range of from about 0.1% to about 50% by weight of the cement. In preferred embodiments, the colloidal silica component is present in the cement composition in an amount in the range of from about 1% to about 25% by weight of the cement. As will be recognized by those skilled in the art, the cement compositions of the present invention may also include additional additives such as salts, dispersants, defoaming agents, fluid loss additives, suspension aids, weighting materials, set retarders, and the like.

In some cementing embodiments in which an activator is used, the activator that contacts the colloidal silica component of the cement composition may be provided as part of the cement composition before the cement composition is introduced to the annulus. In other embodiments, the activator may be provided in the annulus before the addition of the cement composition, e.g., the activator may be pumped downhole ahead of the cement composition, the activator may be present in the annulus as a result of an earlier treatment, or the activator may be naturally present in the well bore. In still other embodiments, the activator may be added to the annulus after the cement composition has been pumped downhole.

In some preferred embodiments, the treatment fluid may be combined with a cement composition for use in primary well cementing operations. In general, primary well cementing involves pumping a cement composition into the annular space between the walls of a well bore and the exterior surface of a pipe string, e.g. a liner or a casing, disposed in the well bore. The cement composition is permitted to set in the annular space, thereby forming an annular sheath of hardened substantially impermeable cement that substantially supports and positions the pipe string in the well bore and bonds the exterior surface of the pipe string to the walls of the well bore. In other embodiments, the cement composition incorporating the treatment fluid of the present invention may also be used for plug cementing, squeeze cementing, and the like.

To facilitate a better understanding of the present invention, the following examples of certain aspects of some embodiments are given. In no way should the following examples be read to limit, or define, the scope of the invention.

EXAMPLE 1

Figure 1:
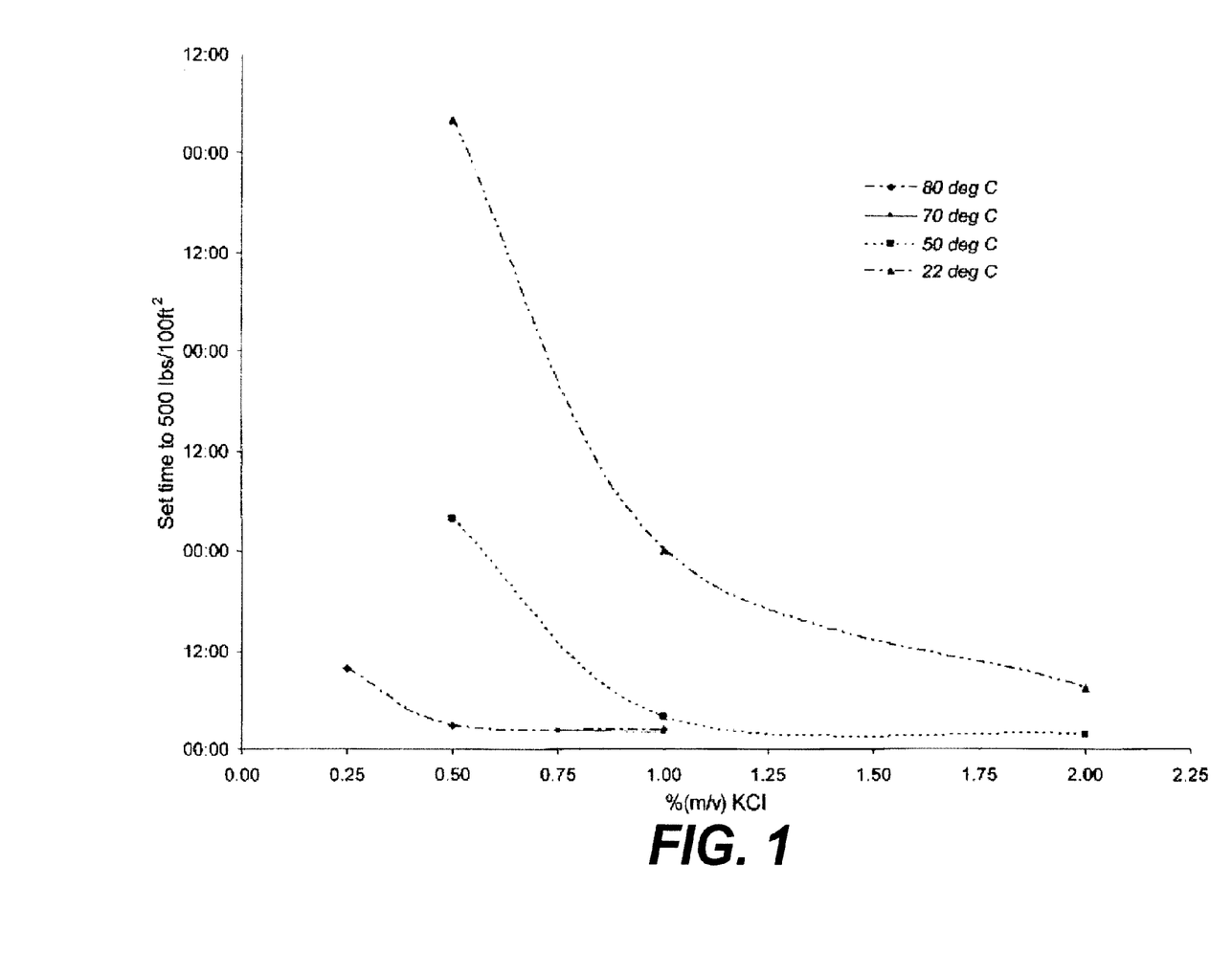
FIG. 1 shows the set time of a colloidal silica gel as a function of activator concentration and curing temperature. In this example embodiment, the activator was potassium chloride.

To determine the effect of temperature and activator concentration on the time required for a mixture of a colloidal silica component and an activator to reach a given viscosity, a base treatment fluid was prepared which comprised an aqueous colloidal silica component. At room temperature, the base treatment fluid had an API plastic viscosity of 7.5 centiPoise (cP) and an API yield point of 1.8 lb/100 ft$^2$ (0.0879 kg/m$^2$). A potassium chloride activator was added to individual portions of the base treatment fluid in varying amounts to create experimental samples that contained the colloidal silica component and activator in varying relative amounts. The experimental samples were cured at 22° C., 50° C., 70° C., and 80° C., respectively. The gel strength of each sample was measured over time using an apparatus known as the Mini Multiple Analysis Cement Slurry ("MINI MACS™") analyzer until the gel strength reached a final value of 500 lbs/100 ft$^2$ (24.41 kg/m$^2$). The MINI MACS™ analyzer is manufactured by Halliburton and is used to perform consistency test and static gel strength tests under simulated downhole pressure and temperature. The results of the gel strength tests described in this Example are presented in FIG. 1, which shows the time it took each sample to achieve a gel strength of 500 lbs/100 ft$^2$ (24.41 kg/m$^2$).

EXAMPLE 2

To demonstrate the ability of a colloidal silica gel to mitigate the migration of a fluid and/or gas through a cement slurry, the gel strength development of a typical cement slurry was tested at conditions typical for a surface casing in a field where pressurized shallow water zones present a drilling hazard. One design parameter commonly used by the industry when dealing with gas migration and shallow water flow is the time it takes for the static gel strength (SGS) of a slurry to increase from 100 to 500 lbs/100 ft$^2$ (4.88 to 24.41 kg/m$^2$). This time is often referred to as the "transition time." Ideally this time should be as short as possible in order to minimize the time that gas or fluid can migrate into the cement matrix after placement. The cement slurry that was used in this test comprised a class C cement, the colloidal silica commercially available under the trade name FDP-C725-04, a potassium chloride activator, and other cementing chemicals such as a fluid loss control agent, retarder and defoamer. A similar slurry that did not comprise a potassium chloride activator was prepared as a control slurry. It was observed that the time necessary for the SGS of the experimental slurry to increase from 100 to 500 lbs/100 ft$^2$ (4.88 to 24.41 kg/m$^2$) was substantially shorter for the cement slurry that contained an activator (less than 10 minutes) than for the cement slurry that did not (more than 1 hour). Therefore, it is believed that including a colloidal silica component and an activator in a cement slurry may significantly reduce the risk of fluid or gas migration through a cement column.

EXAMPLE 3

In order to determine if the pore space of a typical formation might be blocked by a treatment fluid of the present invention, such that the pore space was substantially impermeable after treatment, the following experiment was performed. In addition, this test was designed to determine whether viscosified treatment fluids of the present invention might be able to withstand pressures of the type that may be encountered across a formation core having high permeability. Bentheim sandstone core was selected for this experiment due to the relatively high permeability of this type of core. The Bentheim sandstone core that was used was substantially clay free, homogeneous, and had a porosity of about 22%. The core measured 3.70 cm in diameter, 5.78 cm in length, and had a permeability of 846 milliDarcies. The pore volume of the cores was determined to be 13.67 mL.

After the core was mounted in a Hassler cell core holder and vacuumed, the core was placed in a vertical orientation and saturated with fresh water. The core was then placed in a horizontal orientation and flowed at several rates to ensure complete saturation with the water and to measure the baseline permeability of the core material. Next, the core was flooded with about 10 pore volumes (i.e., about 10 times the core pore volume) of an experimental sample comprising a colloidal silica component and 0.75% m/v potassium chloride at a rate of 2 mL/min with a backpressure in the opposite direction to baseline measurement. After the 10 pore volumes had been added, the pressure build-up at the injection surface was about 700 psi (48.26 bar). The fluid lines on both ends of the core holder were then flushed with water to remove any gels which may have formed obstructions in the lines.

The temperature was adjusted to 80° C. Proper arrangements were made to avoid pressure build-up in the system. The core was shut in with a confining pressure of 1200 psi (82.74 bar) and a backpressure of 150 psi (10.34 bar) to prevent fluid from evaporating. After 16 hours, flow was first established through the bypass to check for any blockage in the lines. After setting a safety pressure of 1050 psi (72.39 bar) and a working pressure of 1000 psi (68.95 bar), water was pumped into the core at a rate of 0.5 mL/min. As can be seen from FIG. 2 which shows the pressure build-up sequence during the test, there was instantaneous pressure build-up on the injection side of the core, with no pressure being transmitted to the other side of the core. The pump was then set for constant pressure delivery.

Figure 2:
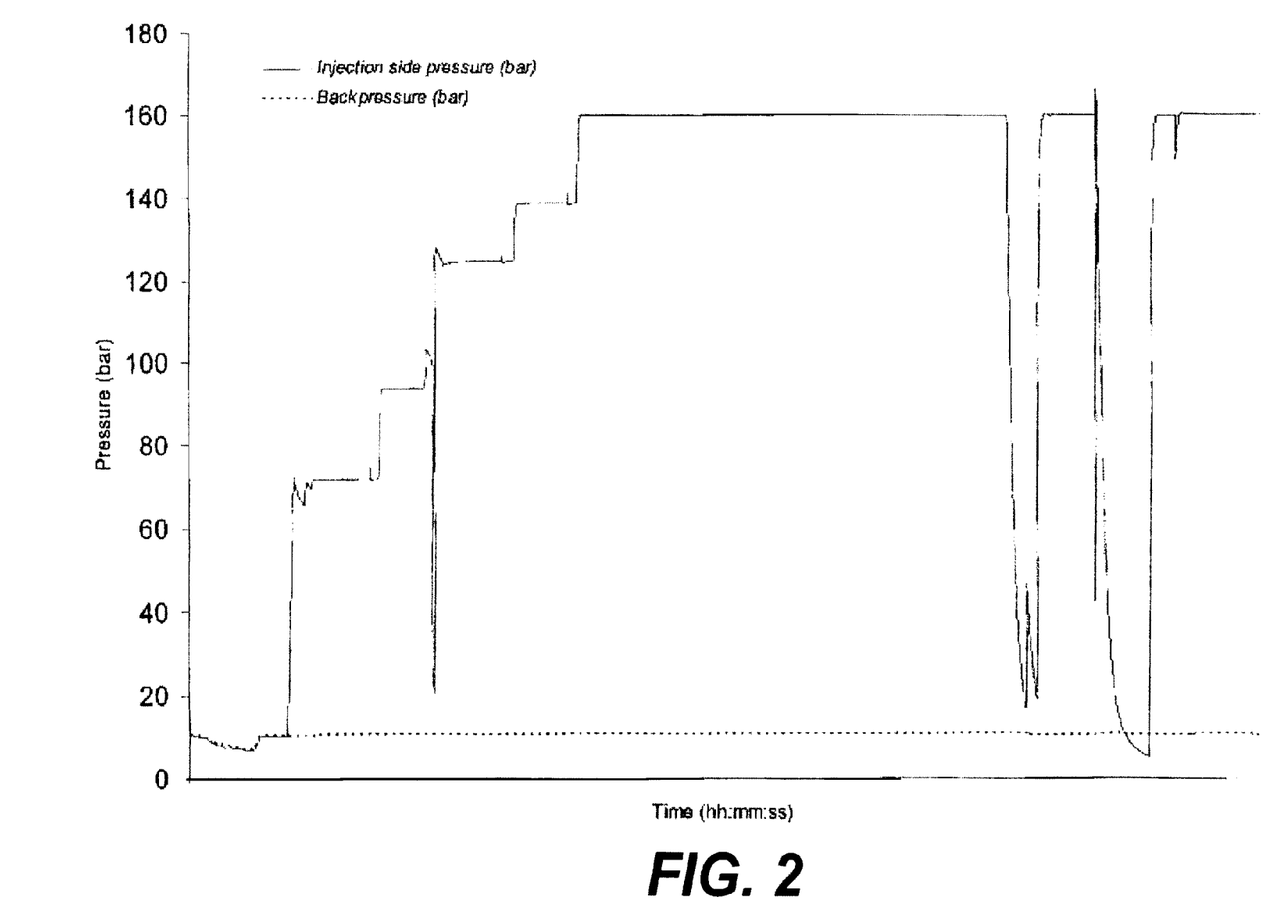
FIG. 2 shows the pressurization and depressurization of an experimental core treated with one embodiment of a treatment fluid suitable for use in the methods of the present invention and a potassium chloride activator.

To determine the breakout pressure, several pressure levels were tested. At each pressure level, a minimum net overburden of 200 psi was maintained, and the pressure was held for about 5 minutes. In order to stay below the pressure limit of the core holder, which was unknown, the maximum confining pressure was limited to 2500 psi (172.36 bar) with a maximum overbalance of 2150 psi (148.24 bar). An extended period of 43 minutes at the maximum overbalance, i.e., 2150 psi (148.24 bar) differential pressure, corresponding to 372 psi/cm (25.65 bar/cm), was carried out. FIG. 2 shows that the pressure held steady with absolutely no pressure increase on the other side of the core. During the last pressure level test, the pump was unexpectedly shut down. However, when the pump was turned back on, the same pressure level was regained and sustained. As this serves as an indication of the strength of the gel blockage system, this was purposefully repeated. As can be seen in FIG. 2, the system withstood the maximum pressure.

EXAMPLE 4

In order to investigate methods of manipulating the gel time of a treatment fluid that comprises a colloidal silica component, the following experiment was performed. Two sets of experimental samples were made as follows: for each experimental sample in a set, 100 grams of a treatment fluid that comprised a colloidal silica component were combined with a varying amount of potassium chloride. The gel times for one set of experimental samples were measured using a Brookfield PVS pressurized rheometer and the gel times for the other set of experimental samples were measured under static conditions, as further described below.

A Brookfield pressurized rheometer was used to measure the gel times of a first set of experimental samples. The gel time reported by a Brookfield pressurized rheometer is based on a significant change in the viscosity of a fluid followed by a period of relative stability. The experimental samples in this set had potassium chloride concentrations of 0% m/v, 0.19% m/v, 0.20% m/v, 0.23% m/v, and 0.25% m/v, respectively. Before testing, each experimental sample was shaken for about 30 seconds to ensure adequate mixing of potassium chloride powder in the sample. The amount of sample required by the Brookfield PVS rheometer was placed in the rheometer, which was set to 400 psi (27.58 bar) and either 92° C. or 100° C., as shown in Table 1.

TABLE 1

Gel Time of Experimental Samples in a Brookfield PVS Rheometer

| KCl | Geltime (Hours) | |
|---|---|---|
| (% m/v) | 92° C. | 100° C. |
| 0 | — | Did not gel within 24 h |
| 0.19 | 7.5 | — |
| 0.20 | 7 | — |
| 0.23 | 4.5 | — |
| 0.25 | 4 | — |

Figure 3:
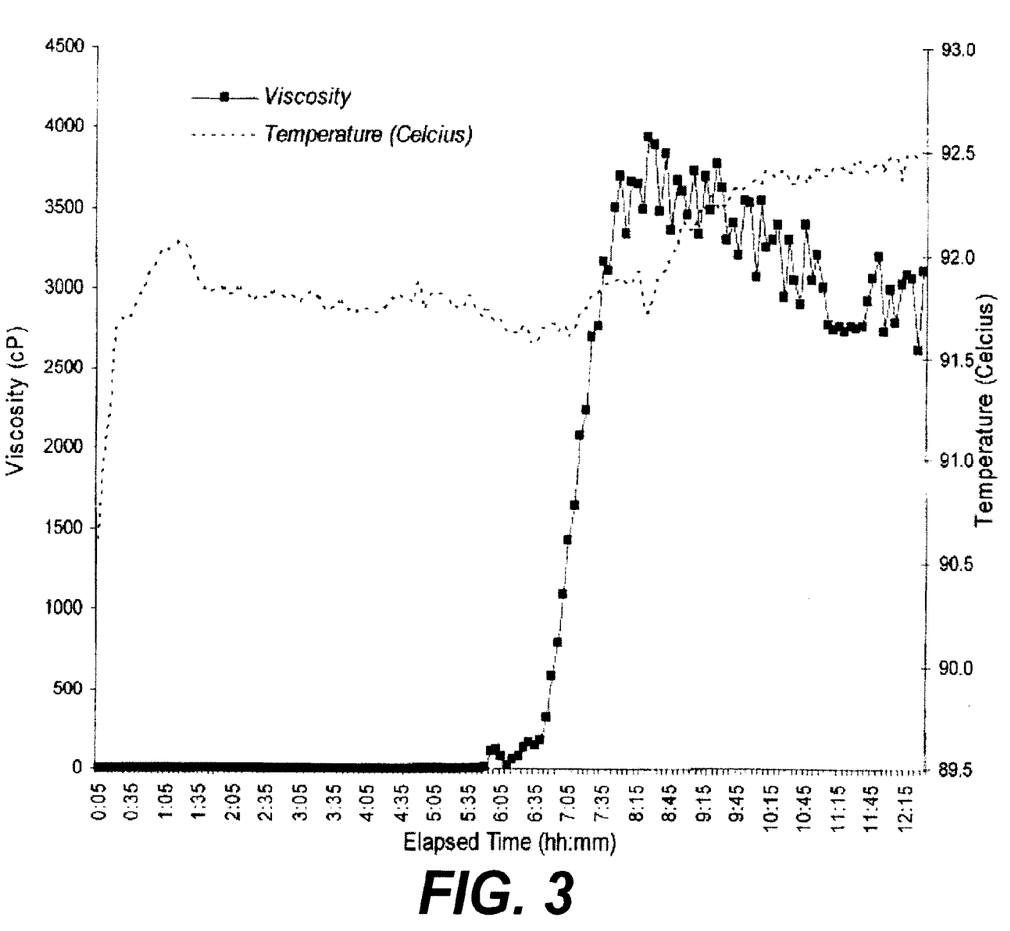
FIG. 3 shows the viscosity of a experimental sample comprising a colloidal silica component and an activator over time.

FIG. 3 illustrates the viscosity of an experimental sample having 0.19% m/v potassium chloride at 92° C. and 400 psi (27.58 bar). From FIG. 3, it is apparent that the viscosity of the experimental sample began to increase rapidly after about 6 hours in the rheometer until it reached a maximum viscosity between 8 and 10 hours from the start of the experiment. By way of explanation and not of limitation, the downward trend in the viscosity of the experimental sample after about 9 hours may be attributable to the constant shearing force applied to the treatment fluid in the rheometer.

Figure 4:
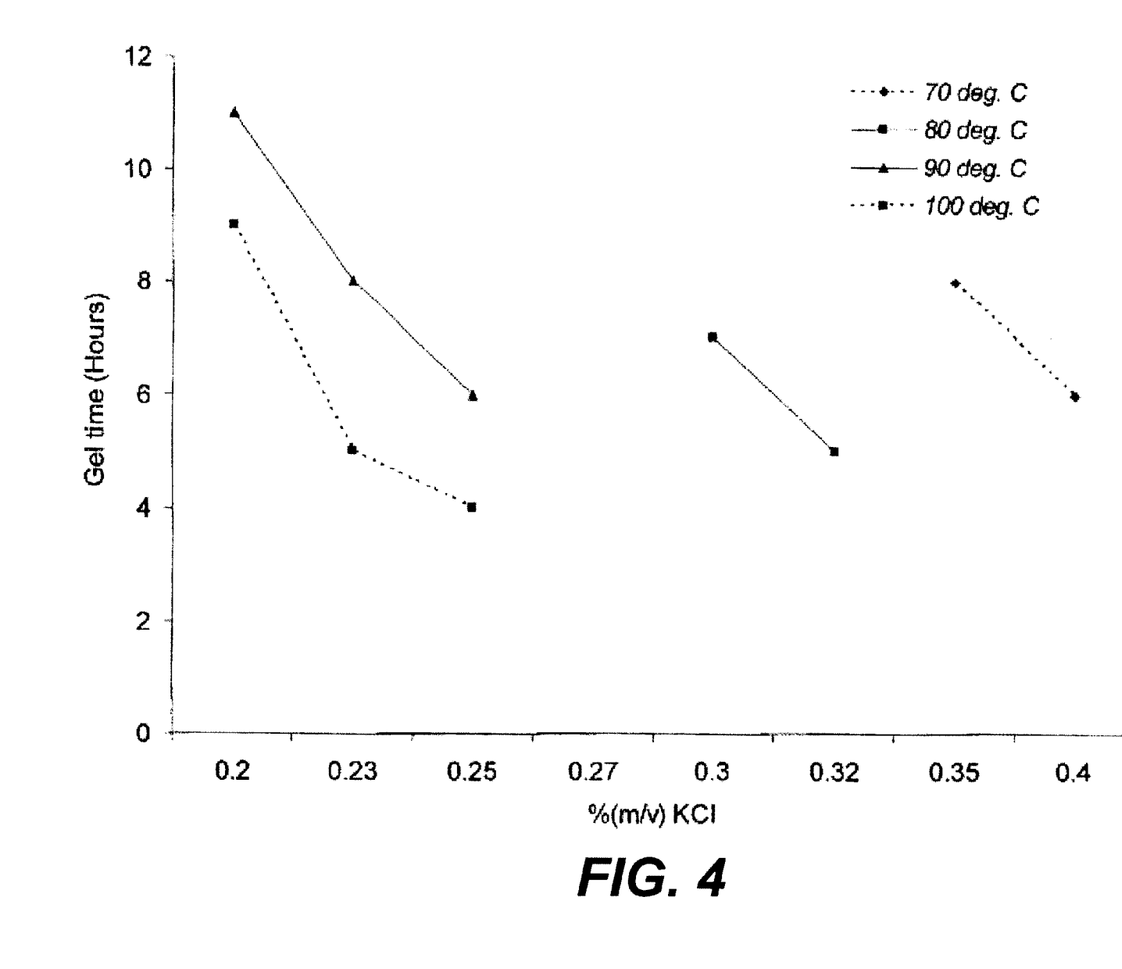
FIG. 4 shows the gel time of experimental samples comprising different relative amounts of a colloidal silica component and an activator at varying temperatures.

The gel times for the second set of experimental samples were measured under static conditions in which the samples were placed in clean 250 mL, glass bottles in a water or oil bath set to a predetermined temperature. The experimental samples in this set had potassium chloride concentrations of 0.20% m/v, 0.23% m/v, 0.25% m/v, 0.30% m/v, 0.32% m/v, 0.35% m/v, and 0.40% m/v, respectively. Before testing, each sample was shaken for about 30 seconds to ensure adequate mixing of the potassium chloride component. For some KCl concentrations, duplicates were prepared, so that the gel time at these concentrations could be measured at two temperatures, as shown in Table 2. Each experimental sample was examined every 30 minutes or 60 minutes by gently turning the sample to the side. The gel time was recorded as the time at which the liquid no longer appeared to move. The gel times at different temperatures are illustrated graphically in FIG. 4.

TABLE 2

Static Gel Times of Experimental Samples in a Water or Oil Bath

| | Gel time (Hours) | | | |
|---|---|---|---|---|
| KCl (% m/v) | 70° C. Water Bath | 80° C. Water Bath | 90° C. Water Bath | 100° C. Oil Bath |
| 0.20 | | | 11 | 9 |
| 0.23 | | | 8 | 5 |
| 0.25 | | | 6 | 4 |
| 0.30 | | 7 | | |
| 0.32 | | 5 | | |
| 0.35 | 8 | | | |
| 0.40 | 6 | | | |

Figure 5:
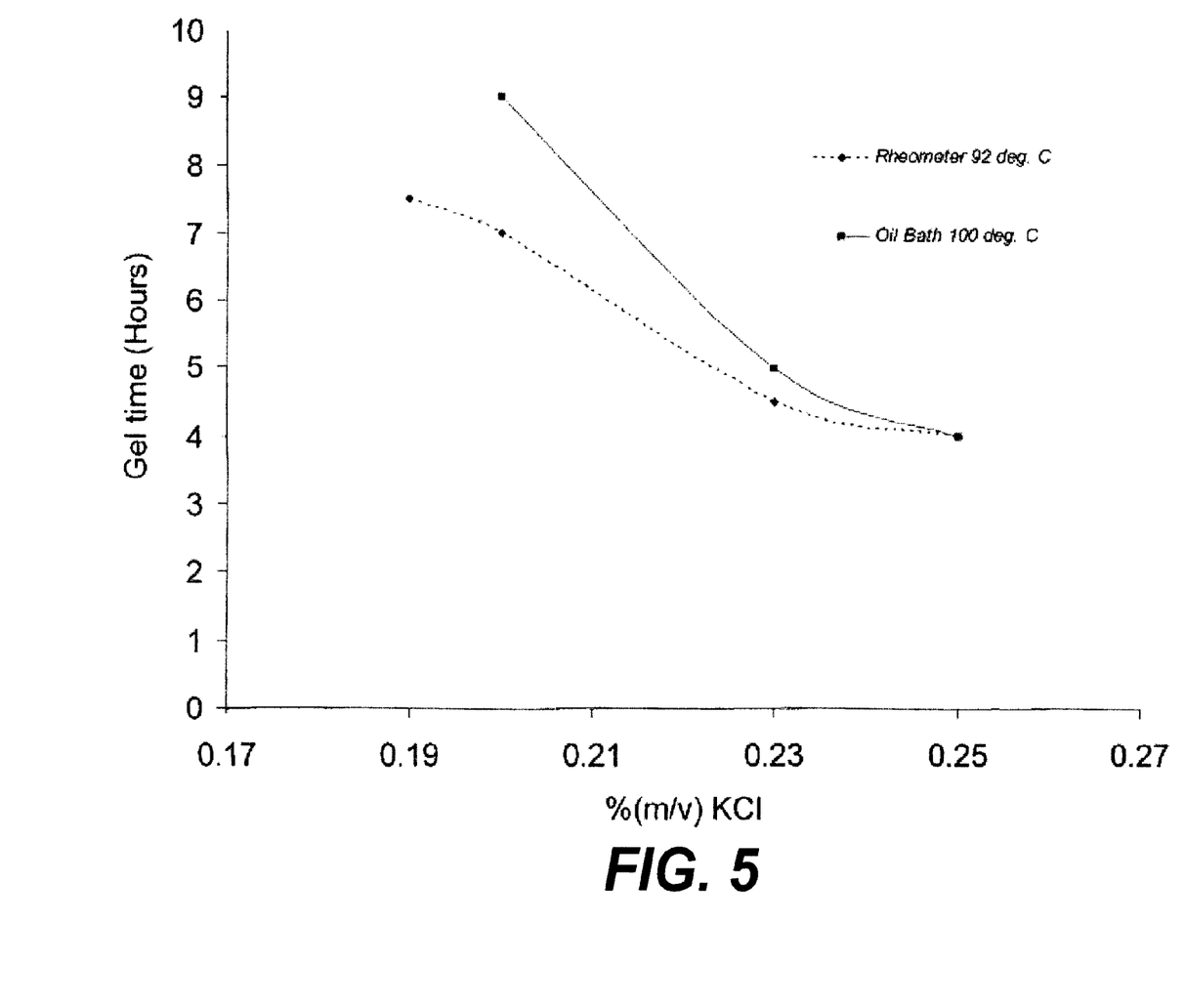
FIG. 5 shows the gel times of experimental samples in a Brookfield PVS rheometer and the gel times of experimental samples under static conditions. The experimental samples comprise a colloidal silica component and an activator.

FIG. 5 compares the gel times observed in the Brookfield PVS rheometer (92° C.) with the gel times observed during the 100° C. static tests. While these results may not be conclusive, it appears that the gel time in the rheometer was slightly shorter than the static gel time. This might be due to differences between the testing methods and slight differences in curing temperature.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (of the form, "from about a to about b," or, equivalently, "from approximately a-to b" or, equivalently, "from approximately a-b") disclosed herein is to be understood as referring to the power set (the set of all subsets) of the respective range of values, and set forth every range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method of controlling water or gas flow through a subterranean formation comprising:
    providing a cement slurry composition that comprises a cement;
    providing a colloidal silica component;
    providing an activator component;
    introducing the cement slurry composition including the colloidal silica and activator into a portion of a wellbore that penetrates a subterranean formation; and
    allowing the cement slurry composition comprising the cement, colloidal silica and activator to remain static;
    whereby a transition time of the cement slurry composition is less than 10 minutes.

2. The method of claim 1 wherein the cement comprises a hydraulic cement.

3. The method of claim 1 wherein the activator comprises at least one activator selected from the group consisting of: a chloride, a nitrate, a sulfate, a sulfide, a hydroxide, and an acid.

4. The method of claim 1 wherein the activator comprises potassium chloride.

5. The method of claim 1 wherein the activator comprises sodium chloride.

6. The method of claim 1 wherein the activator comprises calcium chloride.

7. The method of claim 1 wherein the colloidal silica component is present in the cement slurry composition in an amount of from 0.1% to 25% by weight of the cement.

8. The method of claim 1 wherein colloidal silica particles are present in the colloidal silica component in the cement slurry composition in an amount of from 5% to 60% by weight of the colloidal silica component.

9. The method of claim 1 wherein the activator is present in an amount in the range of from 0.001% m/v (mass/volume) of the colloidal silica component to 10% m/v of the colloidal silica component.

10. A method of controlling water or gas flow through a subterranean formation comprising:
    providing a cement slurry composition that comprises a cement;
    providing a colloidal silica component in an amount of from 0.1% to 50% by weight of the cement;
    providing an activator component comprising at least one activator selected from the group consisting of potassium chloride, sodium chloride, and calcium chloride;
    introducing the cement slurry composition including the colloidal silica and activator into a portion of a wellbore that penetrates a subterranean formation; and
    allowing the cement slurry composition comprising the cement, colloidal silica and activator to remain static;
    whereby the transition time for the cement slurry composition is shorter than the transition time for the same cement slurry composition absent the activator component.

11. The method of claim 10 wherein the cement comprises a hydraulic cement.

12. The method of claim 10 wherein the colloidal silica component is present in the cement slurry composition in an amount of from 0.1% to 25% by weight of the cement.

13. The method of claim 10 wherein colloidal silica particles are present in the colloidal silica component in the cement slurry composition in an amount of from 5% to 60% by weight of the colloidal silica component.

14. The method of claim 10 wherein the activator is present in an amount in the range of from 0.001% m/v (mass/volume) of the colloidal silica component to 10% m/v of the colloidal silica component.

* * * * *